US012058721B2

(12) United States Patent
Kim et al.

(10) Patent No.: US 12,058,721 B2
(45) Date of Patent: Aug. 6, 2024

(54) SYSTEMS, APPARATUSES, AND METHODS FOR SEMI-PERSISTENT SCHEDULING IN COMMUNICATION NETWORKS

(71) Applicant: Mitsubishi Electric Research Laboratories, Inc.

(72) Inventors: Kyeong Jin Kim, Lexington, MA (US);
Hao Song, Cambridge, MA (US);
Jianlin Guo, Cambridge, MA (US);
Philip Orlik, Cambridge, MA (US);
Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 371 days.

(21) Appl. No.: 17/649,089

(22) Filed: Jan. 27, 2022

(65) Prior Publication Data
US 2023/0239910 A1    Jul. 27, 2023

(51) Int. Cl.
*H04W 72/542* (2023.01)

(52) U.S. Cl.
CPC ............................. *H04W 72/542* (2023.01)

(58) Field of Classification Search
CPC ... H04L 1/1854; H04L 1/1822; H04L 1/1812; H04W 72/232; H04W 72/56; H04W 72/20
See application file for complete search history.

(56) References Cited

U.S. PATENT DOCUMENTS

| | | | | |
|---|---|---|---|---|
| 2019/0199420 | A1* | 6/2019 | Faxér | H04L 5/0057 |
| 2022/0311556 | A1* | 9/2022 | Singh | H04L 1/1854 |
| 2023/0091141 | A1* | 3/2023 | Zhang | H04B 7/088 |
| | | | | 370/277 |
| 2023/0283415 | A1* | 9/2023 | Blankenship | H04L 1/1854 |
| | | | | 370/329 |
| 2023/0291508 | A1* | 9/2023 | Blankenship | H04L 1/1854 |

* cited by examiner

*Primary Examiner* — Mahran Y Abu Roumi
(74) *Attorney, Agent, or Firm* — Gene Vinokur; Hironori Tsukamoto

(57) ABSTRACT

A method for semi-persistent scheduling (SPS) based resource allocation in a private 5G network comprises receiving location data of a plurality of user equipment (UEs) in the private 5G network in a last subframe of respective current communication periods of the UEs and determining distance distribution of the UEs in a subsequent communication period of a candidate UE of the plurality of UEs, based on the respective location data of the UEs. The method further comprises determining signal to noise ratio expectation of the UEs for the subsequent communication period, solving an optimization problem optimizing an expectation of data to be carried by each of the one or more SPS channels in the subsequent communication period, to obtain scheduling result for each of the one or more SPS channels and generating resource allocation data for the candidate UE based on the scheduling result.

20 Claims, 11 Drawing Sheets

SYSTEMS, APPARATUSES, AND METHODS FOR SEMI-PERSISTENT SCHEDULING IN COMMUNICATION NETWORKS

TECHNICAL FIELD

The present invention is directed towards systems, apparatuses, and methods for semi-persistent scheduling in communication networks in general and specifically pertains to semi-persistent scheduling scheme for low-latency and high-reliability transmissions in private and local fifth generation (5G) networks.

BACKGROUND

In almost every communication system that caters to multiple devices, resource availability is limited for supporting full duplex communication. Some communication systems utilize multiple access techniques to serve multiple users with the fewer resources available for disposal. An important aspect of currently available multiple access techniques is scheduling devices for communication. In traditional scheduling schemes, resources are assigned according to users' data requirements and channel states. This involves executing a series of complicated steps before a device is assigned resources for communication and such steps incur a significant delay in the overall communication process. As such, in addition to being unsuitable, such communication systems also act as a hindrance to development of applications that rely on time-sensitive communication. Accordingly, there is a need for a robust scheduling scheme that is suitable for time sensitive and related mission critical applications.

SUMMARY

Embodiments of the present disclosure are based on realization that if a device has data to transmit data, it has to receive the measurement configuration from a base station (BS) first, so that the device can send reference signals to the BS for uplink channel measurements. Meanwhile, the device needs to send scheduling request indicator (SRI) to the BS, requesting wireless resources for uplink transmissions. Based on measured uplink channel states and users' requests, the BS conducts scheduling for all users and informs them of scheduling results through scheduling signaling transmitted on physical downlink control channels (PDCCHs). Some embodiments are based on the realization that to adapt to the change of wireless environments, scheduling should be conducted and updated very frequently. Some embodiments are based on the realization that traditional scheduling methods relying on a series of the aforementioned complicated system procedures may be inapplicable in time sensitive network applications such as private and local fifth generation (5G) communication because of several special characteristics of the time sensitive networks.

Some embodiments are based on the realization that the network may be part of an industrial setup where short but frequent communication occurs between the devices connected by the network. Some embodiments are based on the realization that oftentimes transmitted data may be short messages, such as machine control order, sensor information, and health care data, which only consist of few data, while need to be transmitted periodically and frequently. Some embodiments are based on the realization that some messages may be delay-sensitive, which have a predefined lifetime and will be outdated if their lifetimes are expired.

Some embodiments are based on the realization that numerous users may coexist in private networks. For example, in an industrial environment, a large amount of industrial internet-of-thing (IIoT) devices may need to be supported by private 5G networks. Some embodiments are based on the realization that for industrial automation, for example, motion control, low latency, high reliability, and determinism are key quality of service (QoS) requirements.

The aforementioned realizations lead to a conclusion that traditional scheduling schemes are not capable of supporting private and local 5G networks with two main technical issues. Firstly, numerous users with massive frequent short messages will result in huge burden and overhead to the system if the traditional scheduling relying on complicated system procedures is applied. Second, numerous users and massive messages may prolong the time of signal processing and computations in traditional scheduling, causing a long delay and making delay-sensitive messages expired. Apparently, the traditional approaches for SPS do not provide reliability, since wireless resource cannot be allocated according to accurate and instantaneous channel states.

Some embodiments of the present disclosure aim to redesign the scheduling process for private and local 5G networks with licensed frequency bands. Towards this end, some embodiments provide a semi-persistent scheduling (SPS) scheme for low-latency and high-reliability uplink transmissions, to enable "grant-free" and immediate uplink access to private 5G users. In order to truly support time sensitive communications, some embodiments of the present disclosure provide enhanced clarity on the reliability improvement of SPS. Some embodiments are directed towards the technical details design of a redesigned SPS scheme, and a scheduling algorithm aimed at improving reliability.

According to some embodiments, instead of re-scheduling SPS channels in each sub-frame, a minimum scheduling time unit, called a SPS period, may be defined which consists of multiple sub-frames. A user equipment (UE) uses the same allocated and reserved wireless resources to conduct uplink transmissions within the SPS period. By this way, if a private 5G device, which is also a UE, has messages that need to be transmitted, it may immediately access its allocated SPS channels to transmit data without waiting for the scheduling by the base station (BS). This reduces the latency of uplink transmissions. Additionally, the system process of both private 5G BSs and users become more efficient with a low operational complexity, as the complicated system procedures that support frequent and instantaneous resource allocations are not needed.

Thus, to enhance reliability of the proposed SPS over the variations of wireless environments, embodiments of the present invention utilize the following two steps that are based on the distance distribution of private 5G users within a SPS period.

Some embodiments utilize the stochastic geometry for the derivation of the distance distribution of private 5G users. First, modulation and coding schemes (MCSs) are properly selected, taking into account potential channel states and risks in a SPS period rather than only current channel states. Second, using selected MCSs and the data expectation on an SPS channel, an SPS optimization process aimed at reliability improvement, fairness guarantee, and data rate maximization is executed.

Some embodiments provide an SPS scheme for uplink transmissions of local and private 5G networks, enabling "grant-free" and immediate uplink access for private 5G devices. According to some example embodiments, instead of re-scheduling SPS channels in each sub-frame (for example of 1 ins), the minimum time unit of the SPS channel scheduling may be chosen as a SPS period, which consist of multiple sub-frames. For example, a SPS period may include 1000 sub-frames, each of 1 ins, thereby making the SPS period of 1 s. As such, within an SPS period, users may use the same wireless resources to conduct uplink transmissions. By this way, if a UE has messages that need to be transmitted, it can immediately access its allocated/reserved SPS channels to transmit data without waiting for the scheduling by the base station. Thus, some example embodiments reduce the latency of uplink transmissions. Some example embodiments also lead to the system process of both private 5G base stations and users becoming more efficient with a low operational complexity, as the complicated system procedures that support instantaneous resource allocation such as periodic and frequency channel measurement, resource allocation, and signaling exchange, are no longer required.

Some example embodiments consider the moving range of private 5G users (analogously UEs) and their expectation of data rate to improve reliability. With the moving range considered, the scheduling system (for example BS) takes into account not only the current channel states but also possible channel states in the next SPS period, so that sufficient SPS channel resources will be scheduled to each user in order to cover all possible channel state situations in the next SPS period and guarantee transmission reliability.

Some example embodiments provide a method for semi-persistent scheduling (SPS) based resource allocation in a private 5G network. The method comprises receiving location data of a plurality of user equipment (UEs) in the private 5G network in a last subframe of respective current communication periods of the UEs. The method further comprises determining distance distribution of the UEs in a subsequent communication period of a candidate UE of the plurality of UEs, based on the respective location data of the UEs. The signal to noise ratio (SNR) expectation of the UEs for the subsequent communication period is also determined, based at least in part on the distance distribution of the UEs. The SNR expectation defines an amount of data to be carried by one or more SPS channels in the subsequent communication period. The method for SPS based resource allocation further comprises solving an optimization problem optimizing an expectation of data to be carried by each of the one or more SPS channels in the subsequent communication period, to obtain scheduling result for each of the one or more SPS channels. The method further comprises generating resource allocation data for the candidate UE based on the scheduling result and transmitting the resource allocation data to the candidate UE for uplink communication.

Some example embodiments provide a communication apparatus for semi-persistent scheduling (SPS) based resource allocation in a private 5G network, comprising circuitry configured to receive location data of a plurality of user equipment (UEs) in the private 5G network in a last subframe of respective current communication periods of the UEs. The circuitry is further configured to determine distance distribution of the UEs in a subsequent communication period of a candidate UE of the plurality of UEs, based on the respective location data of the UEs. The circuitry is further configured to determine signal to noise ratio (SNR) expectation of the UEs for the subsequent communication period, based at least in part on the distance distribution of the UEs, the SNR expectation further defining an amount of data to be carried by one or more SPS channels in the subsequent communication period. The circuitry is further configured to solve an optimization problem optimizing an expectation of data to be carried by each of the one or more SPS channels in the subsequent communication period, to obtain scheduling result for each of the one or more SPS channels, generate resource allocation data for the candidate UE based on the scheduling result, and transmit the resource allocation data to the candidate UE for uplink communication.

Another embodiment of the present disclosure provides a non-transitory computer readable storage medium embodied thereon a program executable by a computer for performing a method for semi-persistent scheduling (SPS) based resource allocation in a private 5G network. The method comprises receiving location data of a plurality of user equipment (UEs) in the private 5G network in a last subframe of respective current communication periods of the UEs. The method further comprises determining distance distribution of the UEs in a subsequent communication period of a candidate UE of the plurality of UEs, based on the respective location data of the UEs. The signal to noise ratio (SNR) expectation of the UEs for the subsequent communication period is also determined, based at least in part on the distance distribution of the UEs. The SNR expectation further defines an amount of data to be carried by one or more SPS channels in the subsequent communication period. The method for SPS based resource allocation further comprises solving an optimization problem optimizing an expectation of data to be carried by each of the one or more SPS channels in the subsequent communication period, to obtain scheduling result for each of the one or more SPS channels. The method further comprises generating resource allocation data for the candidate UE based on the scheduling result and transmitting the resource allocation data to the candidate UE for uplink communication.

Some example embodiments also provide a method for communication between a communication device and a base station in a private 5G network. The communication device and the base station have a base period of transmission defined therebetween as a minimal scheduling period. The method comprises transmitting location data of the communication device in a last subframe of a current communication period of the communication device, receiving resource allocation data including a transmission period widening factor for one or more subsequent communication periods of the communication device, wherein the transmission period widening factor defines a widening of the base period of transmission, and computing a semi-persistent scheduling (SPS) period as a subsequent communication period based on the transmission period widening factor and the base period of transmission. The method further comprises performing uplink communication based on the resource allocation data and the SPS period.

Some example embodiments also provide a communication apparatus for communication with a base station in a private 5G network. The communication apparatus and the base station have a base period of transmission defined therebetween as a minimal scheduling period. The communication apparatus comprising circuitry configured to transmit location data of the communication device in a last subframe of a current communication period of the communication device, receive resource allocation data including a transmission period widening factor, wherein the transmission period widening factor defines a widening of the base period of transmission, and compute a semi-persistent scheduling (SPS) period as a subsequent communication period based on the transmission period widening factor and the base period of transmission. The circuitry is further configured to perform uplink communication based on the resource allocation data and the SPS period.

Another embodiment of the present disclosure provides a non-transitory computer readable storage medium embodied thereon a program executable by a computer for performing a method for communication between a communication device and a base station in a private 5G network. The communication device and the base station have a base period of transmission defined therebetween as a minimal scheduling period. The method comprises transmitting location data of the communication device in a last subframe of a current communication period of the communication device, receiving resource allocation data including a transmission period widening factor, wherein the transmission period widening factor defines a widening of the base period of transmission, and computing a semi-persistent scheduling (SPS) period as a subsequent communication period based on the transmission period widening factor and the base period of transmission. The method further comprises performing uplink communication based on the resource allocation data and the SPS period.

Some example embodiments provide avenues and opportunities to implement applications utilizing true time sensitive networks (TSN). For example, in the context of an industrial set up, example embodiments help schedule communication for a plethora of interdependent and interconnected devices in a manner that is not detrimental to the underlying industrial process. By taking into consideration the moving area report that corresponds to respective locations of users in a network, example embodiments of the present disclosure help realize seamless connectivity among the users.

As noted above, example embodiments provide a TSN network that supports applications that cannot be supported by conventional network in which there needs to be rescheduling of transmission for every SPS period. Some advantages and benefits of these features are that the network capacity can be increased, resulting in addressing the today's increasing demands for faster networking speeds.

For example, VOIP solutions and video chat apps are part of today's business and our personal lives, along with online multiplayer games that have become mainstream hobbies. To enable these applications, huge volumes of data are being exchanged online at ever-more-massive rates. A delay in the transmission of data—i.e. latency—can have an enormous impact on user experience. The methods and systems of the present disclosure can provide the capacity required to meet the demanding network capacity requirements of today's business and consumers.

Communication devices, systems, and networks realized using the example scheduling schemes can thus exhibit significant improvements over the conventional technology. A user equipment performing communication as per the exemplar scheduling scheme can perform data communication with reduced delay, thus supporting new applications which would otherwise have required a wired or other dedicated connectivity means. A base station implementing the exemplar scheduling scheme will not have to reschedule a device repeatedly and often, thus reducing the computational burden as well as increasing the capacity to cater to more devices at a time.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Figure 1:
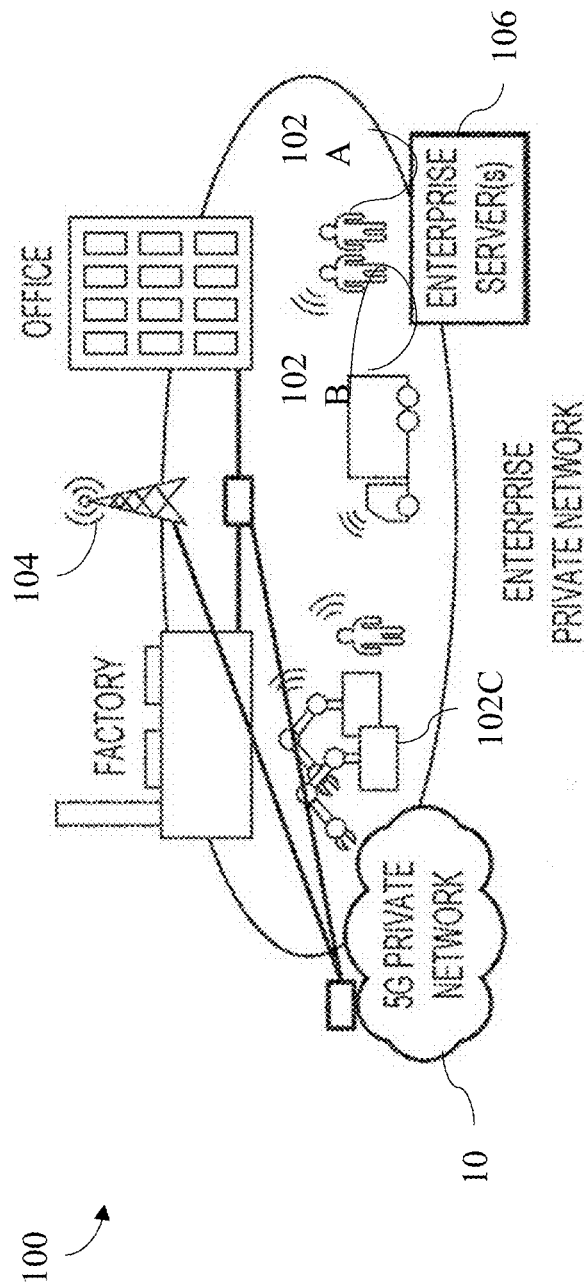
FIG. 1 is an illustration of an enterprise private network, according to some example embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Some embodiments of the invention provide a system and a method for semi-persistent scheduling in communication networks. With mobile users, some services are characterized by regularly occurring transmission of relatively small payloads. In most of these services, it is essential that the payloads reach the destination within a stipulated period of time to meet acceptable levels of quality of service. Towards this end, several attempts have been made to reduce the delay between the availability of data to be transmitted and actual transmission of that data at a node. Since there may be several participants in a communication system, there is no specific order or pattern in which data communication may occur from the participants. As such, it is a challenge to meet the communication requirements for all the users.

Multiple Access (MA) is a phenomenon that caters to the problem of how to ensure the most productive use of a communication channel (that is, maximize the total, or "sum" throughput) when users have sporadic need to transmit and cannot coordinate their needs and actions amongst them. Owing to large number of users and in order to provide seamless connectivity options, it is important to provide a robust scheme to implement multiple access. Scheduling is one such scheme wherein the system assigns wireless resources according to users' data requirements and channel states. In most scenarios, if a device has data to transmit, it has to receive the measurement configuration from a base station (BS) first, so that the device can send reference signals to the BS for uplink channel measurements. Meanwhile, the device needs to send scheduling request indicator (SRI) to the BS, requesting wireless resources for uplink transmissions. Based on measured uplink channel states and users' requests, the BS conducts scheduling for all users and informs them of scheduling results through scheduling signaling transmitted on physical downlink control channels (PDCCHs).

In most scenarios, the set of two-way communication steps enlisted above has to be performed every time the device has data to transmit. These steps incur a significant amount of delay since each instance of communication with the BS may be prone to a delay. Furthermore, in an overall communication process where the user is moving, there may be a frequent change in the wireless environment. To adapt to the change of wireless environments, scheduling is updated very frequently, which may be conducted every sub-frame (1 ms). Thus, traditional scheduling relies on a series of complicated system procedures, which may cause considerable latency and overhead.

With connectivity applications growing exponentially across industries and domains, industrial networks are becoming more vital and diverse. It is common to deploy multiple technologies on a single site: Low-Power WANs (LPWANs) for sensors, location/positioning beacon mesh, Wi-Fi, industrial Ethernet Programmable Logic Controllers (PLCs) and enterprise Wide Area Network (WAN) for branch/supply chain connectivity. Enterprises that deploy their private cellular networks to comply with their specifics needs, unmet by telecom operators and are well aware that industrial networks are complex, fragmented and costly.

5G communication technology aims at simplifying private and semi-private network configuration and management. It aims to bring high interoperability with legacy technologies and a network slicing technology that can open new collaboration schemes between industrial players and the telecom ecosystem.

Cutting-edge manufacturing sites, distribution centers and numerous other campus environments can benefit from the deployment of a private 5G infrastructure supporting either 4G or 5G radio access networks. From algorithmic updates to a production process, predictive maintenance of machinery and real-time interaction with autonomous distribution vehicles, private 5G networks afford numerous advantages for modern enterprises. The 5G Service Based Architecture (SBA) affords the ability to establish distinct network slices, comprising completely independent control and user plane functions. This allows mobile network operators to partition their public network, creating a practically unlimited number of private LTE or 5G instances supporting their enterprise customers.

Private networks are a promising new connectivity model for businesses and individuals. The owners of the private networks can optimize services at their facility by planning and installing their own networks and establishing reliable communication within a specific area by an exclusive use of available resources. For example, for factors such as safety, security, privacy, reliability, latency, device density, and throughput, some industrial and private applications, such as transportation, mining, container port, health care, and manufacturing, intend to operate relying on their own private networks rather than public commercial networks. Such private networks require a high level of flexibility and customization to meet their requirements. Since owners of the private networks have complete control over every aspect of the network, they can determine how resources are utilized, how traffic is prioritized, how a specific security standard is deployed, and so on. The deployment of the private networks can be feasible in the shared spectrum or unlicensed spectrum. A major motivation behind private 5G is the support for industrial Internet of Things (IIoT), where the enterprise has the ability to operate its own network (e.g., in a factory, processing plant, airport, mining facility, etc.).

However, private 5G networks hold special characteristics and come with their own set of challenges. A large number of users may co-exist in private 5G networks. For example, in an industrial environment, numerous Industrial Internet-of-thing (IIoT) devices may need to be supported by private 5G networks. Secondly, transmitted data may be short messages, such as machine control order, sensor information, and health care, which only consist of few data but need to be transmitted periodically and frequently. Some of messages are delay-sensitive, which have a pre-defined lifetime and will be outdated if their lifetimes are expired. Moreover, for industrial automation, for example, motion control, integration of massive sensing technologies, and worker safety, ultra-low latency, reliability, and determinism are key requirements. Unlike conventional 5G networks that are mainly for outdoor coverage, the private and local 5G networks are developed for a specific area, where channel condition is much more unstable and hostile, which provides challenge to scheduling. For public 5G networks, the user may have high mobility. However, in local and private 5G networks, user mobility is relatively low or may be localized. Some example embodiments utilize this fact for scheduling to improve reliability.

FIG. 1 illustrates an enterprise private network 100, according to some example embodiments. An enterprise may generally provide enterprise private network 100 for communications in one or more office locations of the enterprise. The enterprise private network 504 may include one or more enterprise servers 106 (e.g., application servers, authentication servers, etc.). In the present example, private 5G network 10 of the enterprise may be provided in a factory or plant of the enterprise. Data communication may occur between one or more user equipment and one or more other equipment in the enterprise premises. For example, user equipment (UE) 102A may be a handheld device carried by personnel within the enterprise premise, for example in the factory. The UE 102A may communicate with other UE(s) within the factory, with a control system associated with the factory, or to some other communicatively coupled device that may reside within or outside the factory. Such a communication may be carried through the private 5G network 10. Similarly, user equipment 102B may be a vehicle enabled with wireless communication capabilities and may perform data communication with another equipment through the private 5G private network. In some example embodiments, the private 5G network 10 may also provide communication link between the user equipment 102C, which may be a robotic manipulator, and other devices in the enterprise.

In some example embodiments, the private 5G network 10 may provide a communication link to the user equipment (102A, 102B, or 102C) via one or more base stations such as a gNodeB (gNB). A base station 104 may cater to a plurality of UEs and may implement scheduling according to some example embodiments to provide multiple access to all or a subset of the plurality of UEs. The base station 104 may perform control signaling with the plurality of UEs to communicate individual scheduling results to each of the UEs. The base station 104 may allocate a period (SPS period) for uplink communication to each of the UEs after considering their current channel states. The SPS period may be separately or jointly computed by the base station 104 for each of the user equipment. According to some example embodiments, the base station 104 may take into account not only the current channel states but also possible channel states in the next SPS period, so that sufficient SPS channel resources are scheduled to each UE in order to cover all possible channel state situations in the next SPS period and guarantee transmission reliability. This way, the base station 104 ensures every UE is allocated resources by the time data is available at that device for transmission.

In some example embodiments, the base station 104 repeats the scheduling after lapse of one SPS period. However, to reduce the latency associated with the rescheduling, the base station 104 may provide a different scheme for scheduling wherein the back-and-forth exchange of information between the base station 104 and a particular device (i.e., UE) is reduced. Towards this end, example embodiments utilize a base period of communication between the base station 104 and a user equipment. In some example embodiments, the base station 104 and a user equipment (102A, 102B or 102C) may have defined there between a base period of transmission. The base period of transmission may be determined when a user equipment connects with the base station for the first time in a communication session. For example, as part of initial handshakes and control signaling exchanges, the base station and the user equipment may set a minimal scheduling period as the base period of communication.

The minimal scheduling period may be determined based on factors such as computational capabilities of the user equipment, available bandwidth of the frequency spectrum at the base station. For example, the Japanese government has allocated 200 MHz bandwidth to service providers, enabling them to build private 5G network in the 28.2 GHz-28.3 GHz frequency band. Similarly, the German government has reserved a band of 100 MHz in 3.7-3.8 GHz for the private network targeting at the industrial use. In the USA, the Federal Communications Commission (FCC) allows 3.5 GHz Citizen Broadband Radio Service (CBRS) to be used for private networks.

In some example embodiments, to reduce the payload associated with the downlink communication of the scheduling results, the base station 104 may transmit a widening factor for computation of the duration of the SPS period at the user equipment, thus further reducing the overhead and latency involved with the scheduling. Since, every user equipment has some computational capability, it may be easier for the UE to compute the SPS period using the base period of transmission and the widening factor.

The SPS period may consist of multiple sub-frames. With the developed scheduling scheme, a user equipment may use the same allocated and reserved wireless resources to conduct uplink transmissions within the SPS period. By this way, if a private 5G device, such as the user equipment 102A, 102B, or 102C has messages that need to be transmitted, it may immediately access its allocated SPS channels to transmit data without waiting for the scheduling by the BS 104. As a result, the latency of uplink transmissions is reduced. Additionally, the system process of both private 5G BSs and user equipment becomes more efficient with a low operational complexity, as the complicated system procedures that support frequent and instantaneous resource allocations are not needed.

Figure 2:
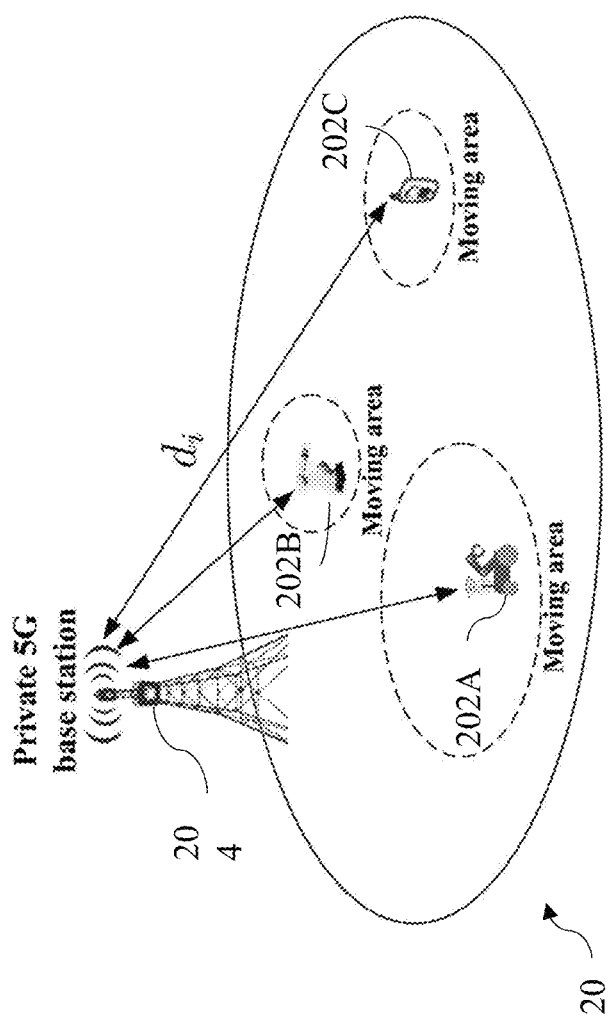
FIG. 2 is a schematic illustrating a system model of a private and local 5G network, according to some example embodiments.

FIG. 2 illustrates a system model of a private and local 5G network 20, according to some example embodiments. The private and local 5G network comprises a base station 204 similar to the base station 104 of FIG. 1 and a plurality of user equipment 202A, 202B, and 202C wirelessly coupled to the base station 204. In some example embodiments, one or more of the user equipment (202A, 202B, or 202C) may be coupled to the base station 204 via its own access point. The user equipment 202A, 202B, and 202C may be of same or different type. The 'type' of a user equipment may correspond to a class or category of a device to which the user equipment may belong to. For example, virtual reality (VR)/augmented reality (AR), sensors, actuators, camera, etc. Such a classification may be pertinent to the enterprise.

The private and local 5G network may be implemented as a part of an enterprise network and may be stand alone or an access-controlled slice of a public 5G network. In some example embodiments, the movement of each of the user equipment 202A, 202B, and 202C may be localized to a certain area within a premise such as the enterprise premises. Each of the user equipment may have a different type of mobility, such as human users, vehicles, and robots.

The user equipment (202A, 202B, and 202C) connect to the private 5G BS 204, conducting uplink data transmissions, while the BS 204 carries out semi-persistent scheduling and schedules each user equipment (or simply users) periodically through downlink control channels. The private and local 5G network may be one with licensed frequency bands. Assuming there are M SPS channels and U users, let U be the set of all users, $U=\{i|i=1, 2, \ldots, U\}$. Since SPS channel resources are usually limited, SPS channel resources may not be able to support all users to be served with SPS. Only partial set of users may be serviceable as SPS users, which should be properly selected considering both reliability and fairness guarantee. In some example embodiments, the private 5G users may be deployed in indoor scenarios with dense devices, such as industrial factories, hospitals, and stations. As such, the path loss may be specified as $$PL(d_i) = 10^{-(13.7\ log\ 10(di)+65.3)/10} \quad (1)$$

where $d_i$ represents the distance between the BS 204 and user i (202A, 202B, or 202C). Owing to the mobility of the users, the distance $d_i$ within the SPS period may be a random variable.

Furthermore, in some example embodiments, the private 5G network 20 may be applied in environments where wireless signals may be obstructed and scattered by obstacles such as buildings, other equipment, and/or other devices. As such, some example embodiments adopt Rayleigh fading to characterize small-scale fading. Accordingly, user i's small-scale fading is notated by $h_i$. With licensed frequency bands, private 5G networks can exclusively access their wireless channels without interference from other systems. To guarantee reliability and avoid interference, the BS 204 may allocate one SPS channel to only one user equipment. Accordingly, in some example embodiments, the signal-to noise ratio (SNR) may be used to characterize channel states, which is given by $$SNR_i = \frac{P_i PL(d_i)|h_i|^2}{BN_0} \triangleq \rho_i PL(d_i)|h_i|^2 \quad (2)$$

where $P_i$ denotes the transmit power of user i and $$\rho_i \triangleq \frac{P_i}{BN_0}.$$

The power gain of the small-scale fading is denoted by $|h_i|^2$. In addition, B and $N_0$ respectively denote the bandwidth of a SPS channel and noise spectral density, respectively.

In some example embodiments, the mobility of a user may be localized or confined to an area within the premise for a period of time. As such, the allocation of resources and scheduling should also take into consideration a possible location at which the user equipment (interchangeably referred to as "user") will be in a subsequent period of time, to guarantee reliability. Towards this end, the BS 204 receives from each user its location information to generate a moving area report for that user. The moving area report for a user may indicate data corresponding to location of the user. The location of the user may be expressed with reference to a universal frame of reference for example as in a GPS based system or relative to another element in the network such as an access point. The location information of a user may be transmitted in a moving area report sub-frame of the user's SPS period. This is explained in detail with reference to FIG. 3A.

Figure 3A:
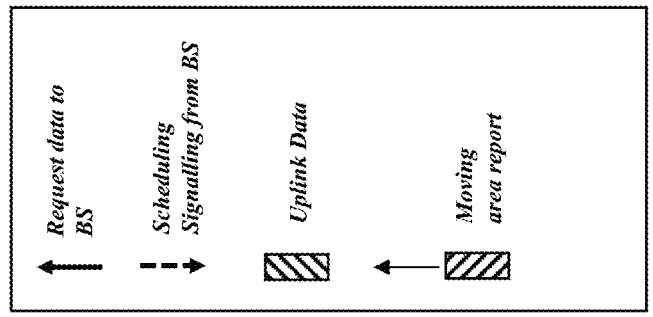
FIG. 3A is a timing diagram illustrating frame structure for semi-persistent scheduling, according to some example embodiments of the present disclosure.
Figure 3A:
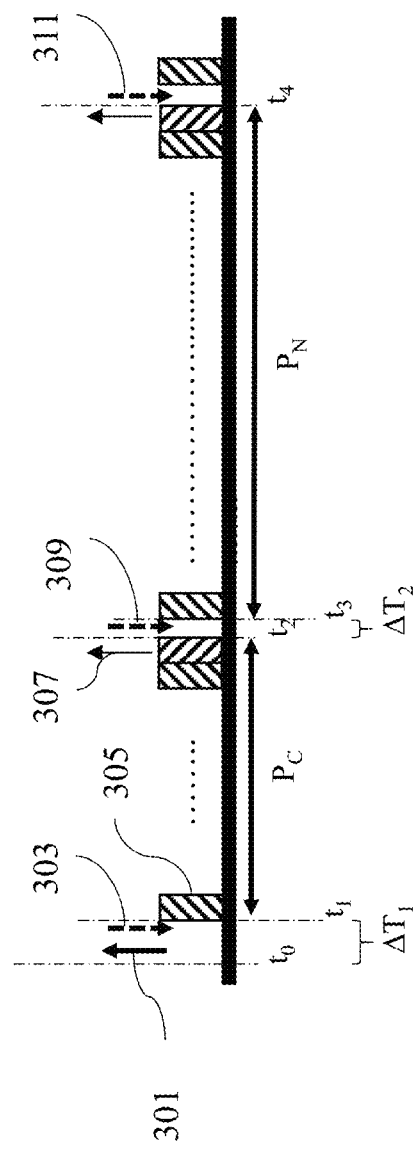
Figure 3B:
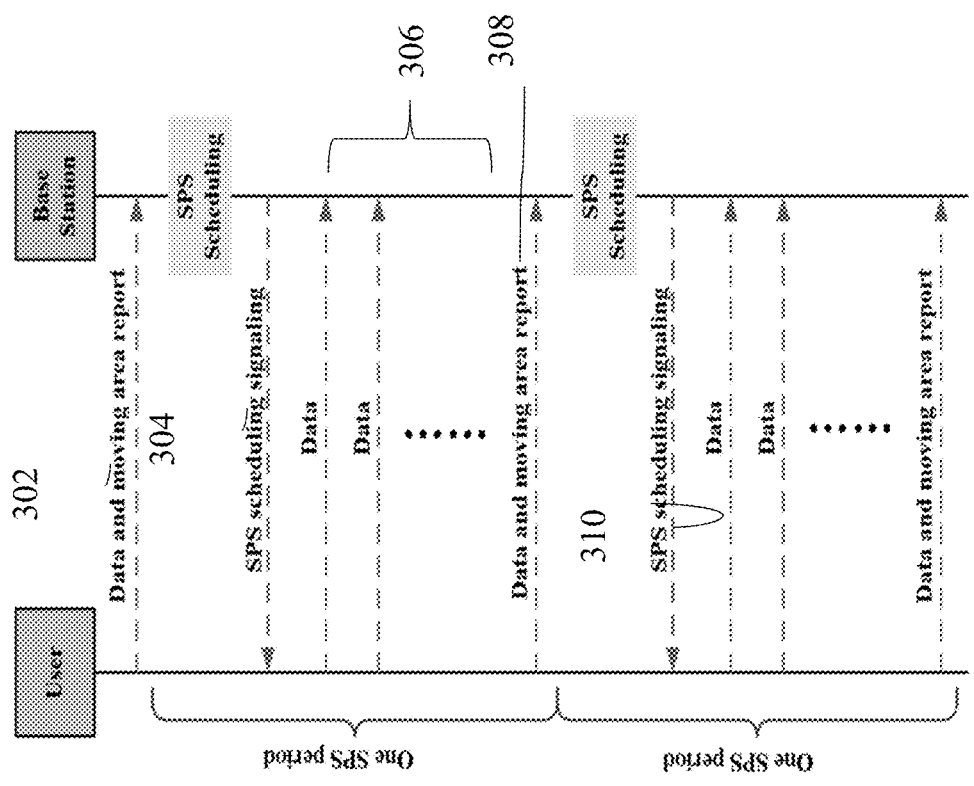
FIG. 3B is a schematic illustrating some steps of a semi-persistent scheduling method, according to some example embodiments.

FIG. 3A is a timing diagram illustrating frame structure for semi-persistent scheduling, according to some example embodiments of the present disclosure. FIG. 3B is a schematic illustrating some steps of a semi-persistent scheduling method, according to some example embodiments. Details of some example embodiments pertaining to the semi-persistent scheduling method and algorithm are described with joint reference to FIGS. 3A and 3B. The time domain may be divided into SPS periods with identical or unequal time lengths. Each SPS period may consist of multiple sub-frames such as data subframe for data transmission, SPS scheduling signaling sub-frame for communicating SPS scheduling results and moving area report subframe. At time instance $t_0$, a user may witness availability of data to be transmitted through the private 5G network. For example, in a scenario similar to the one illustrated in FIG. 2, the user 202A which is a robotic manipulator in a factory setup, may obtain image data for a subject. The robotic manipulator 202A is programmed to transmit this image data of the subject to a central server for further processing. Thus, the robotic manipulator 202A may convey the availability of the image data to its interface, which may trigger the communication process described in several embodiments of this disclosure. Accordingly, the controller of the user (the robotic manipulator 202A in the referenced example of FIG. 2) may transmit a request for radio resource allocation 301 to the BS. The BS may perform scheduling for the user for the current period $P_C$ and the user receives scheduling signalling 303 from the BS at time instance $t_1$. The time delay $\Delta T_1$ incurred between the instance at which data is available for transmission at a user and its actual transmission may be defined as $$\Delta T_1 = t_1 - t_0 \quad (3)$$

Upon receipt of the scheduling signalling, the user may transmit data 305 on the allocated channel(s) during its current SPS period $P_C$. However, in the last subframe of the current SPS period $P_C$, the location information 307 of the user may be transmitted to the BS. Towards this end, the user equipment may be equipped with suitable location sensors that determine the geo-location of the user equipment. For example, the user equipment may be equipped with a global positioning system (GPS) sensor. In some example embodiments, the geo-location information of the user may be determined from signals provided by an access point with which the user may be connected. For example, any suitable positioning technique such as triangulation may be utilized. In some example embodiments the user equipment may be localized to move within an area around the access point. In such a scenario, if the area is limited within a threshold distance from the user equipment, the geo-location information of the access point may be considered to be the geo-location information of the user equipment.

The BS may utilize the geo-location information of the user to evaluate its moving area in the next SPS period $P_N$. Details regarding evaluation of the moving area of the user are described later with reference to FIG. 4. The BS may then perform the scheduling for the next SPS period $P_N$ and transmit 304, 310 the scheduling results 309 around time instance $t_2$ which marks the end of the current SPS period $P_C$. Thus, shortly thereafter at time instance $t_3$, the user may commence or continue transmission 306 of data in the next SPS period $P_N$. Again, in the last sub-frame of the next SPS period $P_N$, the user may send 302, 308 its location information and the processing may continue. The time delay $\Delta T_2$ incurred during re-allocation of the scheduling results and actual transmission of data corresponding to the next SPS period $P_N$ may be defined as $$\Delta T_2 = t_3 - t_2 \quad (4)$$

As is clearly depicted in FIG. 3A, $T_2$ is less than $T_1$. Thus, embodiments of the present invention reduce the latency involved with communicating scheduling signaling, reduces uplink transmission latency, and mitigates system complexity.

Figure 4:
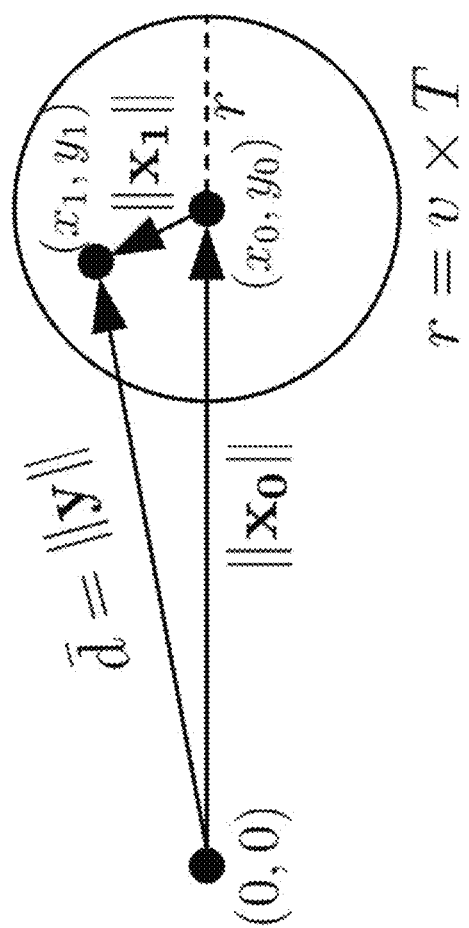
FIG. 4 is a schematic illustrating a model for determining distance between a base station and a user equipment, according to some example embodiments.

FIG. 4 is a schematic illustrating a model for determining distance between a base station and a user equipment, according to some example embodiments. Coordinates ($x_0$, $y_0$) correspond to a user's position provided by its reported geo-location information. The user's maximum velocity v, and the time length of the SPS period T may then be obtained. For example, the maximum velocity v of the user may be obtained from an analysis of the geo-location information over a period of time. In some example embodiments, since the user operates within a preset premise, there may be restrictions imposed on the maximum limit of the velocity. An upper limit of the permissible velocity of the user may thus be considered to be the value of maximum velocity v. In some example embodiments, the user may operate with a predefined velocity and in such a case, the value of the maximum velocity may be taken as the predefined velocity.

Since the movement of a user may be unpredictable within the SPS period, the moving area of a user may be defined using localization techniques. For example, the user may be assumed to be localized within an area defined as a circle centered around coordinates $(x_0, y_0)$ with the radius of v×T without loss of generality. Apparently, the moving area involves all possible positions of the user in the next SPS period. In some example embodiments, apart from position information, users could also report and update their data rate requirements through the moving area report sub-frame if their data communication requirements have changed. For freshness, the moving area report sub-frame is located at the last sub-frame of each SPS period to provide the latest position information. That is, since the moving area sub-frame is located in the last subframe of the SPS period, it signifies the most recent location of the user. Thus, the estimation of moving area using the most recent location of the user is likely an accurate one and accordingly, the scheduling performed using the accurate moving area report is suitable and reliable.

In some example embodiments, the location of the user equipment may be provided by positioning modules in the user equipment. As described previously, the user equipment may be equipped with a GPS sensor, a GLONASS sensor, an IRNSS sensor or the like to provide recent location of the user. In some example embodiments, additionally or alternately, the user equipment may be equipped with other onboard/on-device provisions such as accelerometers, compasses, and computer vision. In some example embodiments, when the GPS signals are not available, alternative methods that use on-device techniques, may be used to improve or completely provide the required positioning accuracy. Towards this end, suitable techniques available in the art may be used without departing from the scope of this disclosure. Such scenarios may find use in local areas where channel condition is much more unstable and hostile, and which raise challenges to scheduling.

In some example embodiments, the user equipment may be "things" in an industrial IoT setup. The "things" may be only operating or moving in a particular area to execute particular operations and tasks. Some non-limiting examples of the "things" may include robots, vehicles, machines, and sensors. As such, a non-limiting but feasible way to harvest location information without GPS may be to deploy an access point (AP)/sensor in each pre-defined moving area. In some example embodiments, the APs or sensors may be used to detect users' signal strength. If a user's signals are detected to be strongest in an AP/sensor, the corresponding moving area of the AP/sensor may be regarded as the user's moving area. In some example embodiments, for users with unpredictable movements and no particular moving area, like wireless devices held by humans, their moving areas can be assumed to be very large, which is equal to the whole area covered by the base station.

After obtaining the location information of a user, the BS conducts signal processing and computing process to obtain SPS channel scheduling results for the users in the network. One example is to build the virtual environmental of Things to build an interactive monitoring and controlling under dynamic wireless environment by AR and IoT devices. The BS informs all users of the SPS channel scheduling results through the SPS scheduling signaling sub-frame, which is the first sub-frame of each SPS period, as described with reference to 303 of FIG. 3A and 304 of FIG. 3B. According to the SPS channel scheduling results, users of the private network perform uplink transmissions on theirs allocated SPS channels in the rest of SPS period, including all the data sub-frames and the moving area report sub-frame. Thus, unlike conventional SPS, the proposed SPS considers user mobility prediction. In addition, the invented SPS scheduling is formulated as an optimization problem and therefore, provides optimal scheduling.

To compute the corresponding coverage probability, reference may be made back to FIG. 4, where the base station may be assumed to be located at origin (0, 0) with the height of 1, while the center of the user's moving area and an arbitrary position within the SPS period may be designated through coordinates $(x_0, y_0)$ and $(x_1, y_1)$, respectively. Coordinates $(x_0, y_0)$ may be fixed and known, for example it may be provided by the reported position information of the user. In some example embodiments, $(x_1, y_1)$ may be unknown and randomly selected. Let $X_0=(x_0, y_0)$, $X_1=(x_1-x_0, y_1-y_0)$, and $Y=(x_1, y_1)$ denote the vectors from the BS to the moving area center, from the moving area center to the user, and from the BS to the user, respectively. The distance between the BS and the user is given by $\bar{d}=\sqrt{x_1^2+y_1^2}$. Without loss of generality, it may be assumed that a user is uniformly distributed in its moving area with the radius of r. Then, the conditional probability density function (PDF) of $\bar{d}=\sqrt{x_1^2+y_1^2}$ conditioned on $\|x_0\|$ may be computed as:

$$f_D(d) \equiv f_D(d\|X_0\|) = f_{\bar{D}}(\bar{d}\|X_0\|) \left|\frac{\partial \bar{d}}{\partial d}\right|_{\bar{d}=\sqrt{d^2-l^2}}$$

$$= \frac{2d}{\prod r^2}\left(\frac{\pi}{2} - \arcsin\frac{d^2-l^2+\|X_0\|^2-r^2}{2\|X_0\|\sqrt{d^2-l^2}}\right), \text{ for } \Delta_A \leq d \leq \Delta_B$$

where $\Delta_A \triangleq \min\left(\sqrt{(\|X_0\|-r)^2+l^2}, l\right)$ and $\Delta_B \triangleq \sqrt{(\|X_0\|+r)^2+l^2}$.

For example, with reference to FIG. 4, the base station may determine the moving area for a user based on the location information obtained for the user. A centroid of the moving area may correspond to the user's location and a distance $d_i$ between user 'i' and the base station may be defined in a suitable manner. This distance $d_i$ for each user may reflect a representation of the distance distribution of the users in the network. Since, users may be dynamic, the distance distribution may also be dynamic. In other words, the distance $d_i$ within an SPS period may be a random variable due to the mobility of users. Using the knowledge of stochastic geometry, the distance distribution of the users may be determined at 502. One example of such usage of stochastic geometry has been provided in the paper "M. Afshang, H. S. Dhillon, and P. H. Joo Chong, "*Modeling and performance analysis of clustered device-to-device net-* works," *IEEE Trans. on Wireless Commun.*, vol. 15, no. 7, pp. 4957-4972, July 2016" the contents of which are herein incorporated in entirety.

Figure 5:
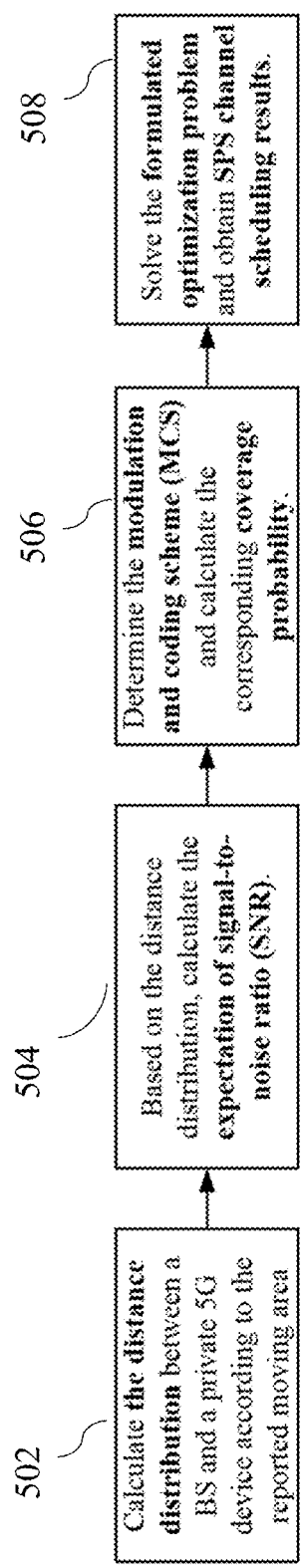
FIG. 5 is a flow diagram illustrating some steps of a method for semi-persistent scheduling in a wireless network, according to some example embodiments.

FIG. 5 illustrates a flow diagram illustrating some steps of a method for semi-persistent scheduling in a wireless network, according to some example embodiments. Having obtained the location information of users as moving area report, the base station calculates 502 according to the reported moving area, the distribution of the distance, expressed by $f_{D(d)}$, between the base station and users. Such a distance distribution may be computed using stochastic geometry for example in a manner illustrated in FIG. 2 and FIG. 4 and described here in more detail with reference to it.

Then, with the distance distribution, the expectation of signal-to-noise ratio (SNR), the expectation of equation (2) with respect to the distribution of $d_i$, i.e., $f_{D_i}(d_i)$, indicating the expected SNR of users in the next SPS period, is computed 504. The SNR expectation of user i may be computed as:

$$\mathbb{E}_{di} = \int \rho_i PL(d_i)|h_i|^2 f_{D_i}(d_i) dd_i \quad (5)$$

where $\mathbb{E}_{di}$ is the SNR expectation of user i with respect to $d_i$, $P_i$ denotes the transmit power of user i and $\rho_i$ $$\triangleq \frac{P_i}{BN_0},$$

denoting the SNR of user i. The power gain of the small-scale fading is denoted by $|h_i|^2$. In addition, B and No respectively denote the bandwidth of a SPS channel and noise spectral density, respectively. As discussed previously, PL ($d_i$) represents the path loss and $f_{D_i}(d_i)$, the distribution of $d_i$, that is, $f_D(d)$ for user i, represents the conditional probability function of the distance between the BS and the user.

Figure 6:
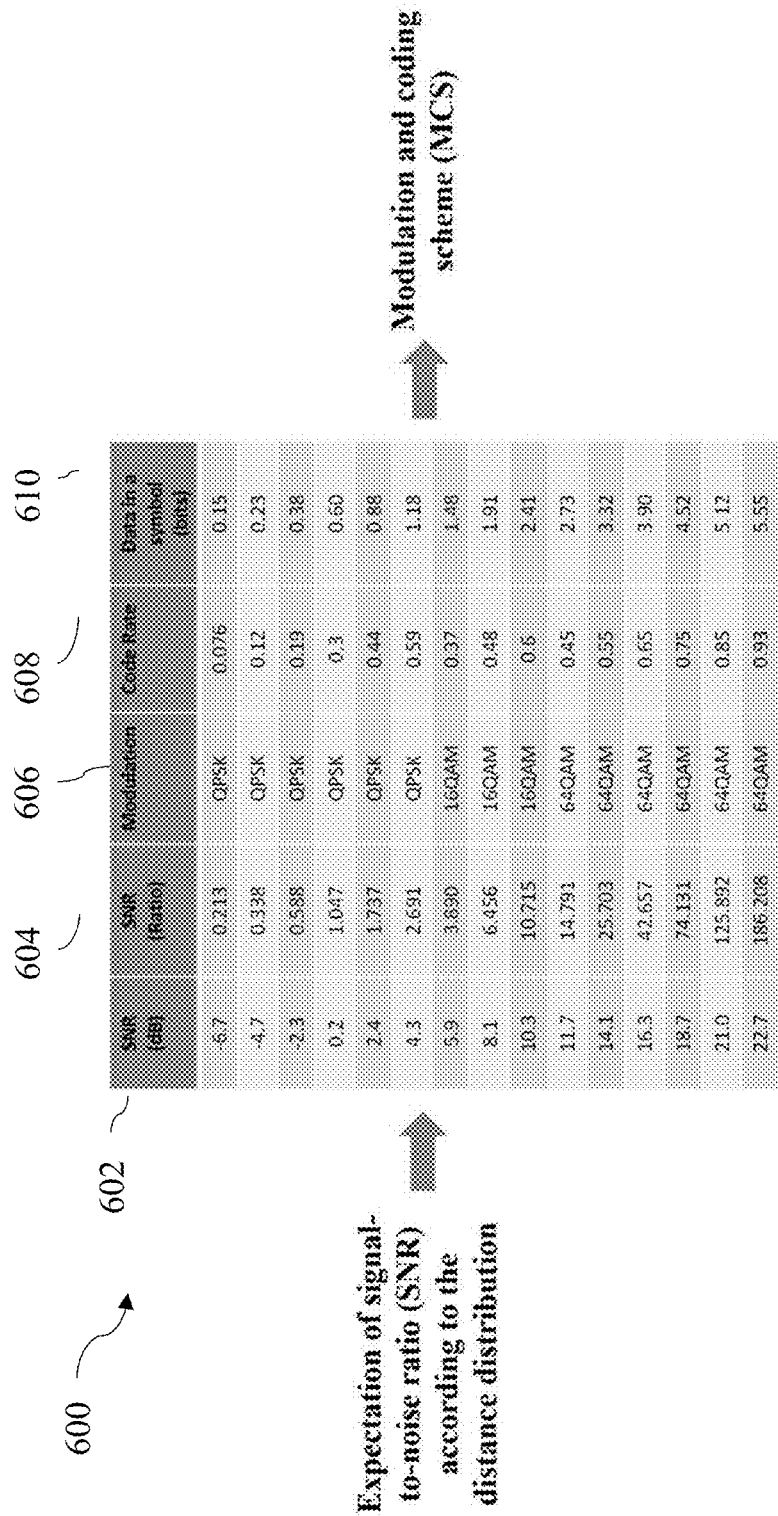
FIG. 6 illustrates a mapping table used for determining modulation and coding scheme, according to some example embodiments.

The expectation of SNR is used to determine (i) the modulation and coding scheme (MCS), which is used in the next SPS period and (ii) the corresponding coverage probability. Towards this end, any suitable method or technique known in the art may be utilized by the base station. For example, to determine the MCS, the LTE specification provides that there are 168 symbols in a SPS channel, where a SPS channel is a physical resource block (PRB) with 180 kHz bandwidth. FIG. 6 illustrates an SNR to MCS mapping table 600 used for determining the MCS, according to some example embodiments. The base station may reference the SNR to MCS mapping table 600 to determine the MCS. The expectation of the SNR according to the distance distribution obtained at 504 in FIG. 5 may be compared with the SNR levels defined in the table 600. Since many signals may have a very wide dynamic range, the SNR may be expressed using the logarithmic decibel scale as shown in 602. In some example embodiments, the SNR may simply be expressed as a ratio as shown in 604. Any suitable technique known in art may be utilized to associate the expectation of SNR obtained at 504 with a corresponding entry of the SNR (602 or 604 as the case may be). For example, a distance between the expectation of SNR obtained at 504 and the SNR values provided in 602 or 604 may be determined and the value for which the distance is minimum may be selected to be the best match. Accordingly, and corresponding to the selected SNR value in the table 600, the modulation scheme 606 and the coding rate 608 may be obtained from the table 600. The data in a symbol 610 defined in bits may also be selected from the table 600. In this way, the MCS may be determined 506 according to the expectation of SNR determined at 504. The SNR to MCS mapping table 600 may be stored in a memory in the base station or a device accessible to the base station. In some example embodiments, the SNR to MCS mapping table 600 may be predefined or in some scenarios dynamically updated manually or automatically according to requirements of the network.

With a selected MCS, the SNR threshold, $\Gamma_i^t$, for successful demodulation and decoding and the amount of data carried by a SPS channel, $D_i^t$, may be obtained, from the table 600. $\sigma_i^t$ and $D_i^t$ represent the SNR threshold and data transmitted in a SPS channel of user in the SPS period t, respectively. For example, for QPSK MCS and 0.338 SINR ratio, $\Gamma_i^t$=0.338, and $D_i^t$=0.15×168 for LTE with 12 symbols in 14 SPS channels.

The coverage probability may be defined as the probability that the SNR of received signals exceeds a threshold $\Gamma$ for successful demodulation and decoding. The value of $\Gamma$, that is determined by the SINR ratio, may be pre-defined, for example, according to the table illustrated in FIG. 6. Given the distance distribution, the coverage probability may be obtained as follows:

$$Pr(\rho PL|(d)|h|^2 \geq \Gamma) = \int Pr(\rho PL(d)|h|^2 \geq \Gamma|D)f_D(d)dd \quad (6)$$

$$= \mathbb{E}_D[Pr(|h|^2 \geq \Gamma/\rho PL(d)|D)]$$

$$= \int \exp(-\Gamma/\rho PL(d)f_D(d \mid \|x_0\|)dd$$

where $\rho \triangleq \frac{P}{BN_0}$

Additionally, Pr(.) and E[.] denote probability and expectation, respectively. The above derivation follows that the power gain of the Rayleigh fading channel obeys the exponential distribution.

Given the selected MCS of user i, the SNR threshold for successful demodulation and decoding, $\Gamma_i$, may be determined. Moreover, the amount of data carried by the SPS channel, $R_i$, is fixed, which is dominated by user i's MCS. An optimization problem aiming at reliability enhancement and fairness guarantee, may thus be formulated and solved 508 as:

$$\max \Sigma_{i \in U} M_i R_i Pr(\rho_i PL(d_i)|hi|^2 \geq \Gamma_i)$$

such that $$M_i R_i Pr(\rho_i PL(d_i)hi|^2 \geq \Gamma_i) \leq \hat{R}_i^{tot}, \text{ for } \forall i \in U \text{ and}$$

$$\Sigma_{i \in U} M_i < M, \quad (7)$$

where $M_i$ is the number of SPS channels allocated to user i, which is the variable of the optimization problem (7). In the constraints, $\hat{R}_i^{tot}$ and M represent the data rate constraint of user i and the total number of SPS channels, respectively. Since M is specific for each i (user), the number of SPS channels to be allocated to a user i can thus be obtained as a part of the scheduling result for the user i. Further, the determined MCS and a length of the SPS period can also be communicated to the user i.

It is noteworthy to mention that the use of the expectation of transmitted data is important for reliability guarantee because of the fact that within a SPS period users may keep using pre-allocated resources to send data and resource allocations cannot be instantaneously adjusted to according to the variation of wireless environments. It is better for scheduling to consider the potential channel states in the SPS period, not only depending on the instantaneous channel states at a moment.

The objective function of the optimization problem (7) is the maximization of the sum of all users' transmitted data expectations, where the expectation of data transmitted on the SPS channel, $R_i \Pr(\rho_i PL(d_i)|h_i|^2 \geq \Gamma_i)$, is considered instead of instantaneous achievable data rate or instantaneous channel states that are widely adopted in traditional scheduling schemes. The expectation of transmitted data reflects the potential channel states in the SPS period, which is determined by the selected MCS and the coverage probability with distance distribution described in (6). The use of the transmitted data expectation enables the private 5G network to assign adequate wireless resources to guarantee that users' requirements can be met even under worse wireless environments. Towards this end, the first constraint ($\hat{R}_i^{tot}$) is used to restrict the number of channels assigned to a user. In this way, the SPS channel resources assigned to a user are just sufficient to meet its data rate requirements and guarantee its reliability, rather than redundant resources allocated to pursue global maximization. As a result, given limited SPS channel resources restricted by the second constraint M, as many as possible users could be served with low-latency SPS transmissions with preferable reliability.

In some example embodiments, $\hat{R}_i^{tot}$ may not be exactly equal to the data rate requirement of user i, $R_i^{tot}$, where $R_i^{tot}$ is the amount of data required to be transmitted in a sub-frame. This is because the data rate requirement $R_i^{tot}$ utilized as an upper bound on the first constraint may cause that SPS channel resources actually allocated to user i cannot meet its requirement. Thus, $\hat{R}_i^{tot}$ should be larger than $R_i^{tot}$ in an appropriate level, avoiding wasting resources. Here, $\hat{R}_i^{tot}$ is defined as the minimum multiple of user i's data expectation, i.e., $R_i^{tot}$, $\hat{R}_i^{tot} = \min\{nE_i | nE_i \geq R_i^{tot}\}$, where n is a positive integer number, and $E_i$ is the data expectation on the SPS channel, expressed by $E_i = R_i \Pr(\rho_i PL(d_i) |h_i|^2 \geq \Gamma_i)$.

With the optimization problem (7), the private 5G system intends to assign SPS channels to users with the high expectation of transmitted data with two reasons. First, assigning the SPS channel to a user with the high data expectation is beneficial to global maximization. Second, for a user with a higher data expectation, under the same data requirements, fewer channels assigned to this user could meet its requirements, so that more channel resources can be saved to serve other users, making more users served with SPS. Clearly, through the optimization problem (7), a good tradeoff is achieved between data rate, reliability, and fairness.

Figure 7:
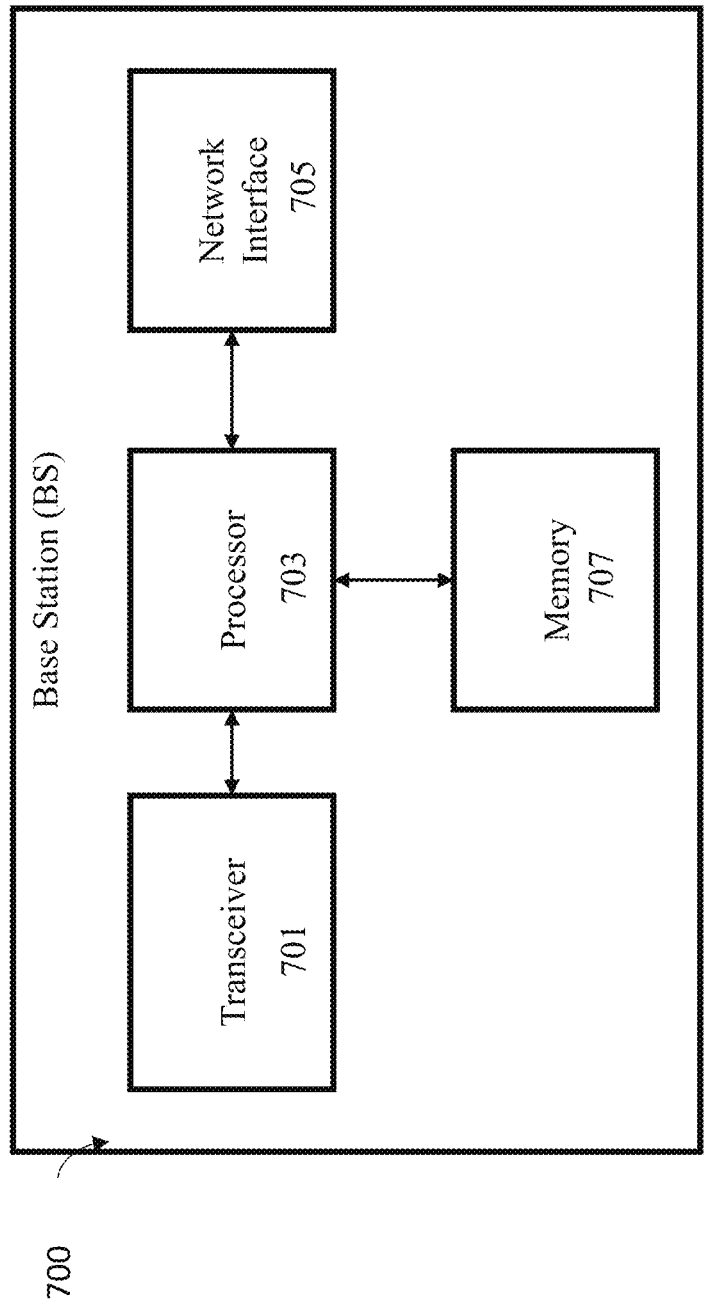
FIG. 7 is a block diagram illustrating elements of a base station, according to some example embodiments.

FIG. 7 is a block diagram illustrating elements of a base station BS (for example the base station 204 of FIG. 2). As shown, the base station 700 may include a transceiver 701 configured to provide radio communications with a plurality of wireless terminals, a network interface 705 configured to provide communications with other base stations of the RAN, and a processor 703 coupled to the transceiver and the network interface, and a memory 707 coupled to the processor. The memory 707 may include computer readable program code that when executed by the processor 703 causes the processor to perform operations according to embodiments disclosed herein. According to other embodiments, processor 703 may be defined to include memory so that a memory is not separately provided. The base station 700 may execute at least the steps described with reference to FIGS. 5 and 6.

Figure 8:
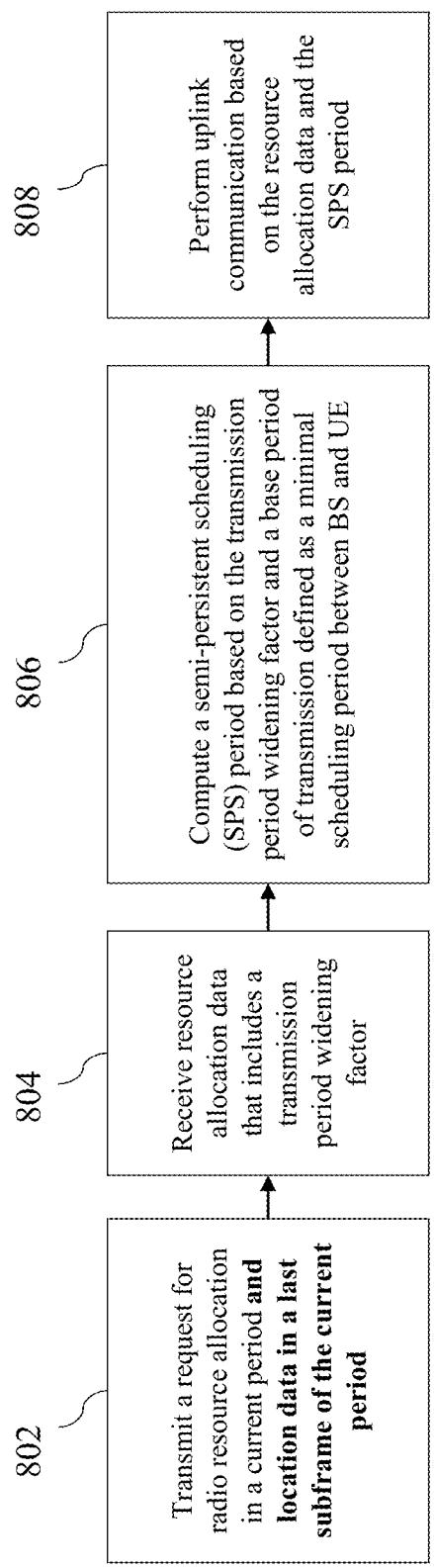
FIG. 8 is a flow diagram illustrating some steps of a method for communication with semi-persistent scheduling in a wireless network, according to some example embodiments.

FIG. 8 is a flow diagram illustrating some steps of a method for communication between a user equipment and another device through a base station according to semi-persistent scheduling in a wireless network, according to some example embodiments. A user equipment, such as the UE 202A, may have communication capabilities to perform data communication with one or more other devices in a network. The communication session occurring at a current time instance may be referred to as the current session for the user equipment and the corresponding current session may have an associated current period of communication. As discussed previously, every communication period may comprise of one or more sub-frames. The user equipment and the base station may have a base period of transmission defined there between as a minimal scheduling period. Such a minimal scheduling period may be established as a part of the initial handshake process or during the first communication session when the user equipment established a communication session with the base station for the first time. This base period of transmission may be stored in an accessible memory in the user equipment and/or the base station for further usage.

The user equipment may transmit 802 a request for radio resource allocation in the current period, for example at the start of the current period. In some example embodiments, in order to help execute the semi-persistent scheduling by the base station, the user equipment may also transmit location data in a last subframe of the current period. The request for radio resource allocation may be triggered when the user equipment anticipates or witnesses availability of data for transmission at any of its communication interfaces. Subsequently, the user equipment may utilize suitable position techniques to determine its location data and append it in the last subframe of the current period so that it reflects the most recent location of the user equipment.

The base station such as the base station 204 of FIG. 2, may receive the request for radio resource allocation and subsequently the location data of the user equipment. The base station may perform semi-persistent scheduling in a manner similar to the one described previously with reference to FIG. 4-6 and provide scheduling results with the resource allocation data to each user equipment. The user equipment may receive 804 resource allocation data that includes amongst other things, a transmission period widening factor for one or more subsequent communication periods of the user equipment. The transmission period widening factor defines a widening of the base period of transmission. For example, the base station may determine the MCS, the channel frequencies and the transmission period widening factor for the user equipment and transmit it to the user equipment.

The user equipment may utilize the MCS and the channel frequencies for an SPS period to perform data transmission. However, in order to do so, the user equipment first needs to compute the SPS period. Towards this end, the user equipment may compute 806 the SPS period as a subsequent communication period of the one or more subsequent communication periods, based on the transmission period widening factor and the base period of transmission. For example, since the base period of transmission is predefined and agreed upon between the user equipment and the base station, the user equipment may fetch the base period of transmission from memory and multiply it with the transmission period widening factor to determine the SPS period as a subsequent communication period. The user equipment has access to the channel frequencies provided in the resource allocation data for a time period equivalent to the computed SPS period. After the lapse of the computed SPS period, the user equipment may release control of the channel frequencies if control signaling for the next period indicates so. In some example embodiments, where the expectation of data transmission in the subsequent period indicates that the user equipment should continue access to the channel frequencies, the base station may compute a broader widening factor for the user equipment. For 'n' subsequent communication periods, the base station may provide the user equipment with a no change indicator if there is no requirement to release the channel frequencies and if the user equipment still has data to transmit. Finally, the user equipment performs 808 uplink communication on the channel frequencies allocated by the base station and based on the computed SPS period.

Figure 9:
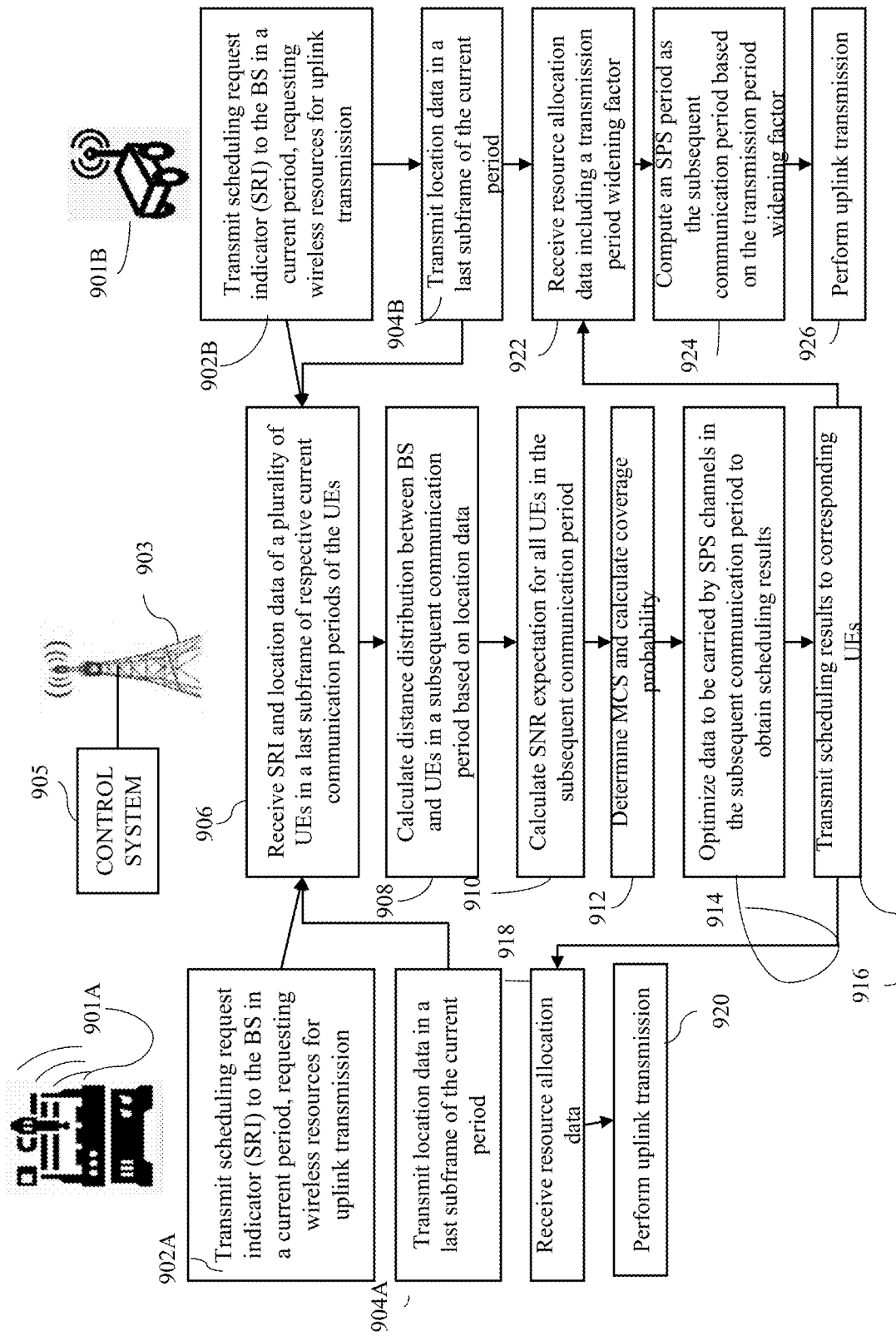
FIG. 9 is a flowchart illustrating a method for implementing semi-persistent scheduling in a wireless network, according to some example embodiments.

In some example embodiments, it may not be feasible for some user equipment to compute the SPS period due to operational limitations such as absence of sufficient computational capabilities or delay intolerance in time sensitive communication. In such scenarios the base station may identify a type of the device and choose to perform the computation of SPS period at the base station itself. That is, in some example embodiments, the base station may identify based on the type of device whether to transmit the SPS period in the radio resource allocation data or transmit a transmission period widening factor only with the radio resource allocation data. Such a hybrid capability may be particularly useful in scenarios where there may exist a mix of different types of devices in the network. FIG. 9 illustrates a hybrid method for implementing semi-persistent scheduling in a wireless network, according to some example embodiments.

User equipment 901A and 901B may be communicatively coupled via a base station 903 to a control system 905 of an industrial setup. For example, in some example embodiments, the control system 905 may receive sensor data from the user equipment 901A and 901B and perform control processing to issue control commands for the user equipment 901A and 901B. It may not be feasible for user equipment 901A to perform fast computations due to one or more reasons such as operational limitations or process requirements. For example, user equipment 901A may be a mobile assembly equipment having electromechanical components generating high heat that is detrimental to performance of a computational equipment such as CPU. As such, user equipment 901A does not have any special computational capabilities on board and has to be provided with most of the signaling for proper functioning. User equipment 901A may be connected to the base station 903 via an access point (not shown) and as such, the location of the user equipment 901A may be ascertained to be the one reported by the access point.

User equipment 901B on the other hand, may be a robotic vehicle having sufficient computational capabilities onboard. In this regard, user equipment 901B may be considered to be equipped with position sensors, memory and a CPU amongst other things. At 902A and 902B, the user equipment 901A and 902B may respectively transmit a scheduling request indicator (SRI) to the base station in a current period, requesting wireless resources for uplink transmission. For example, the SRI may be transmitted in response to availability of sensor data at an egress interface.

Subsequent to the transmission of SRI, the user equipment 901A and 901B may transmit 904A, 904B location data in a last subframe of the current period respectively. As discussed previously, the location data is transmitted in the last subframe of the current period so as to provide the most recent location to the base station 903. In some example embodiments, each of the user equipment 901A, 901B may transmit a type of the device to the base station 903 as well.

The base station 903 receives 906 SRI and location data of a plurality of UEs (including the user equipment 901A, 901B) in a last subframe of respective current communication periods of the UEs. The base station 903 may also receive a type identifier of the respective UEs. In response, the base station 903 may execute scheduling processing. Towards this end, the base station 903 may calculate 908 distance distribution between the BS 903 and UEs (901A, 901B, and any other UE that may be in communication with the BS 903) in a subsequent communication period based on the location data of the UEs. The calculation of distance distribution may be performed in a manner discussed previously with reference to FIG. 4.

Next the base station 903 may calculate 910 SNR expectation for all UEs in the subsequent communication period and determine 912 MCS and calculate coverage probability in a manner discussed previously with reference to FIG. 5. The base station 903 may then optimize 914 the data to be carried by SPS channels in the subsequent communication period to obtain scheduling results for each of the UE. In this regard, the base station 903 may execute the optimization to obtain scheduling results according to a type of the user equipment. For example, for the user equipment 901A the base station 903 may determine the SPS period as part of the scheduling results whereas for the user equipment 901B, the base station 903 may determine the transmission period widening factor as part of the scheduling results. The base station may transmit 916 the respective scheduling result to corresponding UEs over the downlink control channels.

User equipment 901A which does not have computation capabilities receives 918 the scheduling data including the length of the SPS period and performs 920 uplink transmission according to the scheduling data. User equipment 901B on the other hand receives 922 resource allocation data including a transmission period widening factor in a manner similar to the one described with respect to FIG. 8. Subsequently, user equipment 901B computes 924 an SPS period as the subsequent communication period based on the transmission period widening factor and the base period of transmission and performs 926 uplink transmission accordingly.

Thus, example embodiments provide significant improvements to the overall scheduling process by performing scheduling processing according to a type of the user equipment being served. This helps delegate the processing load to some extent to the user equipment, thereby ensuring the base station is capable of catering to time sensitive scenarios. Furthermore, user equipment are able to receive resource allocation data almost by the time data is available for transmission. This greatly improves the performance of user equipment in time sensitive scenarios.

Figure 10:
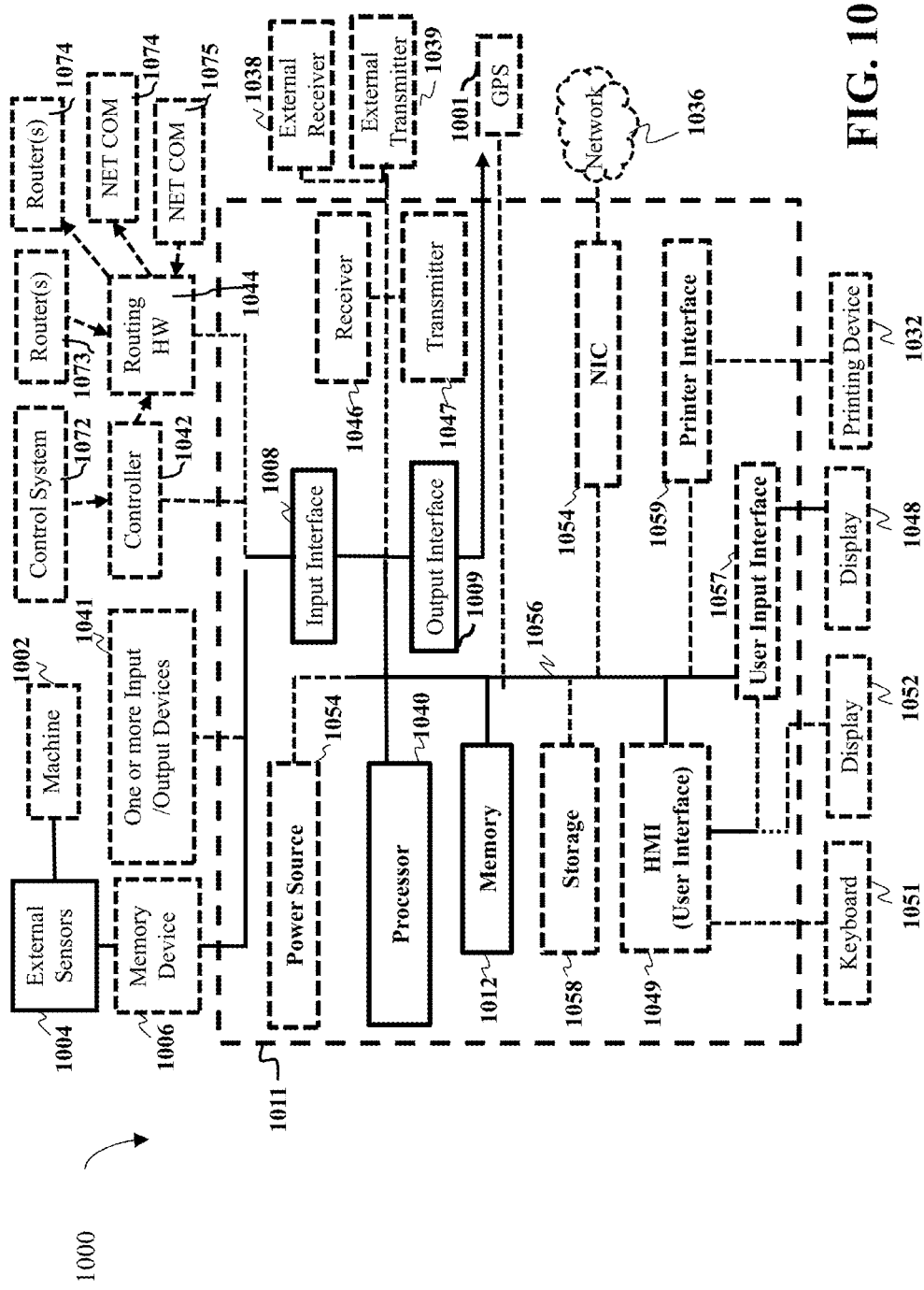
FIG. 10 is a block diagram illustrating an implementation of the user equipment, according to some example embodiments.

FIG. 10 is a block diagram illustrating an implementation of the user equipment, according to embodiments of the present disclosure. A user equipment 1000 may execute thee steps described with reference to FIG. 8 and at least some steps illustrated in FIG. 9. The user equipment 1000 may include a controller 1011 comprising a processor 1040, computer readable memory 1012, storage 1058 and user interface 1049 with display 1052 and keyboard 1051, which are connected through bus 1056. For example, the user interface 1049 in communication with the processor 1040 and the computer readable memory 1012, acquires and stores the data in the computer readable memory 1012 upon receiving an input from a surface, keyboard surface, of the user interface 1057 by a user.

Contemplated is that the memory 1012 can store instructions that are executable by the processor, historical data, and any data to that can be utilized by the methods and systems of the present disclosure. The processor 1040 can be a single core processor, a multi-core processor, a computing cluster, or any number of other configurations. The processor 1040 can be connected through a bus 1056 to one or more input and output devices. The memory 1012 can include random access memory (RAM), read only memory (ROM), flash memory, or any other suitable memory systems.

Still referring to FIG. 10, a storage device 1058 can be adapted to store supplementary data and/or software modules used by the processor. For example, the storage device 1058 can store historical data and other related data as mentioned above regarding the present disclosure. Additionally, or alternatively, the storage device 1058 can store historical data similar to data as mentioned above regarding the present disclosure. The storage device 1058 can include a hard drive, an optical drive, a thumb-drive, an array of drives, or any combinations thereof.

The system can be linked through the bus 1056 optionally to a display interface (not shown) adapted to connect the system to a display device (not shown), wherein the display device can include a computer monitor, camera, television, projector, or mobile device, among others.

The controller 1011 can include a power source 1054, depending upon the application the power source 1054 may be optionally located outside of the controller 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1054 is adapted to connect through the bus 1056 to a network 1036, wherein data or other data, among other things, can be rendered on a third-party display device, third party imaging device, and/or third-party printing device outside of the controller 1011. Further, the bus 1056 can be connected to a Global Positioning System (GPS) device 1001 or a similar related type device.

Still referring to FIG. 10, the data or other data, among other things, can be transmitted over a communication channel of the network 1036, and/or stored within the storage system 1058 for storage and/or further processing. Further, the data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. The controller 1011 may be connected via an input interface 1008 to external routing hardware device(s) 1044 and external input/output devices 1041. The controller 1042 may be connected to an external control system 1072, and to a routing hardware device 1044. The routing hardware device 1044 can have incoming data from router(s) 1073 and network communication device(s) 1044. Wherein the routing hardware device 1044 can have outgoing data to router(s) 1074 and network communication device(s) 1075. Also, an exterior memory device 1006 can be connected to external sensors 1004 and machine 1002, the memory device can be connected to the bus 1056. An output interface 1009 may be used to output the processed data from the processor 1040 via bus 1056.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for semi-persistent scheduling (SPS) based resource allocation in a private 5G network, comprising:
   receiving location data of a plurality of user equipment (UEs) in the private 5G network in a last subframe of respective current communication periods of the UEs;
   determining distance distribution of the UEs in a subsequent communication period of a candidate UE of the plurality of UEs, based on the respective location data of the UEs;
   determining signal to noise ratio (SNR) expectation of the UEs for the subsequent communication period, based at least in part on the distance distribution of the UEs, the SNR expectation further defining an amount of data to be carried by one or more SPS channels in the subsequent communication period;
   solving an optimization problem optimizing an expectation of data to be carried by each of the one or more SPS channels in the subsequent communication period, to obtain scheduling result for each of the one or more SPS channels;
   generating resource allocation data for the candidate UE based on the scheduling result; and
   transmitting the resource allocation data to the candidate UE for uplink communication.

2. The method of claim 1, wherein a number of SPS channels to be allocated to a UE is a variable in the optimization problem.

3. The method of claim 2, wherein the resource allocation data comprises a transmission period widening factor for the candidate UE, the transmission period widening factor defining a widening of a base period of transmission, wherein the base period is a minimal scheduling period for transmission between the candidate UE and a base station, wherein the candidate UE is configured to compute the subsequent communication period based on the transmission period widening factor.

4. The method of claim 3, wherein the resource allocation data further comprises a modulation and coding scheme (MCS) for the candidate UE.

5. The method of claim 1, further comprising determining a modulation and coding scheme for each of the UEs based on the determined SNR expectation of the UEs.

6. The method of claim 1, wherein a plurality of communication periods of channel scheduling are associated with each of the UEs, wherein each communication period of channel scheduling comprises multiple subframes and a respective one of the UEs utilizes a same set of channels for communication during a communication period and wherein each communication period is of identical length.

7. The method of claim 1, wherein the location data of each of the UEs comprises geo-location information of the respective UE.

8. The method of claim 1, wherein the resource allocation data is transmitted to the candidate UE through the first subframe of the subsequent communication period of the candidate UE and wherein the candidate UE is configured to perform uplink communication in all but the last subframe of the remainder of the sub-frames of the subsequent communication period of the candidate UE.

9. The method of claim 1, wherein maximization of a sum of transmitted data expectations for the UEs in the subsequent period of the candidate UE corresponds to the objective function of the optimization problem.

10. A communication apparatus for semi-persistent scheduling (SPS) based resource allocation in a private 5G network, comprising:
  circuitry configured to:
    receive location data of a plurality of user equipments (UEs) in the private 5G network in a last subframe of respective current communication periods of the UEs;
    determine distance distribution of the UEs in a subsequent communication period of a candidate UE of the plurality of UEs, based on the respective location data of the UEs;
    determine signal to noise ratio (SNR) expectation of the UEs for the subsequent communication period, based at least in part on the distance distribution of the UEs, the SNR expectation further defining an amount of data to be carried by one or more SPS channels in the subsequent communication period;
    solve an optimization problem optimizing an expectation of data to be carried by each of the one or more SPS channels in the subsequent communication period, to obtain scheduling result for each of the one or more SPS channels;
    generate resource allocation data for the candidate UE based on the scheduling result; and
    transmit the resource allocation data to the candidate UE for uplink communication.

11. The communication apparatus of claim 10, wherein a number of SPS channels to be allocated to a UE is a variable in the optimization problem.

12. The communication apparatus of claim 11, wherein the resource allocation data comprises a transmission period widening factor for the candidate UE, the transmission period widening factor defining a widening of a base period of transmission, wherein the base period is a minimal scheduling period for transmission between the candidate UE and a base station, wherein the candidate UE is configured to compute the subsequent communication period based on the transmission period widening factor.

13. The communication apparatus of claim 12, wherein the resource allocation data further comprises a modulation and coding scheme (MCS) for the candidate UE.

14. The communication apparatus of claim 10, wherein the circuitry is further configured to determine a modulation and coding scheme for each of the UEs based on the determined SNR expectation of the UEs.

15. The communication apparatus of claim 10, wherein a plurality of communication periods of channel scheduling are associated with each of the UEs, wherein each communication period of channel scheduling comprises multiple subframes and a respective one of the UEs utilizes a same set of channels for communication during a communication period and wherein each communication period is of identical length.

16. The communication apparatus of claim 10, wherein the location data of each of the UEs comprises geo-location information of the respective UE.

17. The communication apparatus of claim 10, wherein the resource allocation data is transmitted to the candidate UE through the first subframe of the subsequent communication period of the candidate UE and wherein the candidate UE is configured to perform uplink communication in all but the last subframe of the remainder of the sub-frames of the subsequent communication period of the candidate UE.

18. The communication apparatus of claim 10, wherein maximization of a sum of transmitted data expectations for the UEs in the subsequent period of the candidate UE corresponds to the objective function of the optimization problem.

19. The communication apparatus of claim 10, wherein the circuitry is further configured to:
  receive a device identifier from each of the UEs, the device identifier identifying a type of the device, and
  determine the SNR expectation of the UEs for the subsequent communication period, based on the device identifiers of the UEs.

20. The communication apparatus of claim 10, wherein the UEs are movable devices transmitting time sensitive data in a factory setup.

* * * * *